United States Patent [19]
Culp

[11] Patent Number: 5,649,504
[45] Date of Patent: Jul. 22, 1997

[54] DUAL LENGTH LEASH SYSTEM

[76] Inventor: Donald E. Culp, 18 Norman Rd., Jamestown, R.I. 02835

[21] Appl. No.: 654,765

[22] Filed: May 29, 1996

[51] Int. Cl.⁶ .................................................. A01K 3/00
[52] U.S. Cl. ................................................... 119/795
[58] Field of Search ...................... 119/769, 770, 119/792, 793, 797

[56] References Cited

U.S. PATENT DOCUMENTS

| | | | |
|---|---|---|---|
| 2,827,017 | 3/1958 | Ryan | 119/793 X |
| 2,861,547 | 11/1958 | Dale | 119/797 |
| 3,332,398 | 7/1967 | Mintz | 119/109 |
| 4,763,609 | 8/1988 | Kulik | 119/797 |
| 5,351,654 | 10/1994 | Fuentes | 119/795 X |
| 5,363,810 | 11/1994 | Kraus | 119/795 |

*Primary Examiner*—Gene Mancene
*Assistant Examiner*—Thomas Price
*Attorney, Agent, or Firm*—Perman & Green

[57] ABSTRACT

The invention of this application provides a leash system comprising a distance lead and a close control lead each with a handle and a clasp suitable for independent use separate from the system. The distance lead is releasably connected to the close control lead at a position intermediate of the length of the close control lead. In this manner two complete leashes are provided in a system that allows either a distant lead for more freedom of movement for the dog or a close control lead to restrain the dog when necessary. In addition each lead is independently useable.

4 Claims, 2 Drawing Sheets

DUAL LENGTH LEASH SYSTEM

BACKGROUND OF THE INVENTION

Anyone who has walked a dog, for pleasure, training or show, has experienced the need to shorten the length of the lead to assert greater control of the dog. This need generally arises when other canines or people approach and there is a danger of undesired contact. In addition when training a dog there is often the need to take aggressive control of the dog to reinforce the commands being given. It is the object of this invention to provide a leash system which meets this need and provides other advantages as well.

There have been several attempts to solve this problem. Among them is the leash described in the reference Dale, U.S. Pat. No. 2,861,547. In this reference there is described a leash having multiple connecting points to enable the leash to be doubled over to halve or quarter the length of the lead. Although this accomplishes a similar purpose, it would be difficult to change the length of the lead while the leash is under tension. This is a severe limitation as the need will generally arise quickly, without a great deal of warning and while the canine is straining against the leash.

U.S. Pat. No. 3,332,398 which issued to Mintz describes a single leash with a loop at the normal end away from the dog and another hand loop at the end connected to the dogs collar. Again when the leash is under tension it will be difficult to grasp the lower leash to make use of this feature. In an attempt to solve this problem and provide an easily constructed leash, another dual handled leash is proposed in U.S. Pat. No. 5,363,810. In this patent a leash is described having a continuous strap folded over and sewn to provide a second handle at the collar end of the leash which is not effected by tension on the leash. As in the other solutions of the prior art, the '810 patent is a single leash and is of limited flexibility in use because of its construction.

SUMMARY OF THE INVENTION

The invention of this application provides a leash system comprising a distance lead and a close control lead each with a handle and a clasp suitable for independent use separate from the system. The distance lead is releasably connected to the close control lead at a position intermediate of the length of the close control lead. In this manner two complete leashes are provided in a system that allows either a distant lead for more freedom of movement for the dog or a close control lead to restrain the dog when necessary. In addition each lead is independently useable.

DESCRIPTION OF THE DRAWING

The leash system of this invention is described below with reference to the drawing in which.

DETAILED DESCRIPTION OF THE PREFERRED EMBODIMENT

Figure 1:
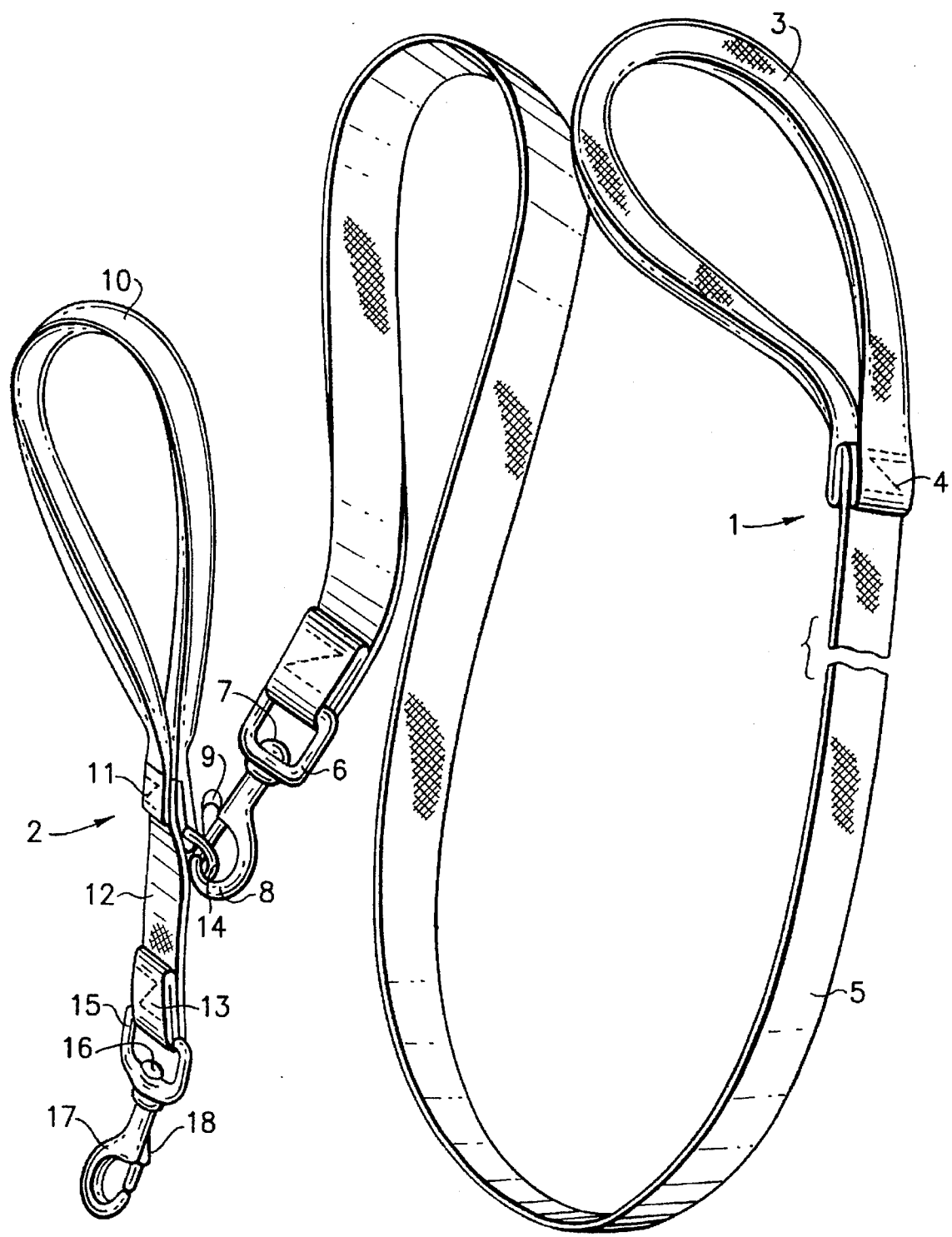
FIG. 1 shows the leash system of this invention.

The leash system of this invention is best shown in FIG. 1. The system consists of a distance lead 1 connected to a close control lead 2. Each of these leads are completely serviceable leashes in their own right and can be disconnected to allow independent use.

The distance lead 1 is constructed with handle portion 3 which is shown sewn at 4 to lead portion 5. Lead portion 5 of the distance lead may extend an appropriate length usually from three to five feet to allow freedom of movement of the dog away from the handler. Lead portion 5 is sewn to ring 6 of clasp 8 which are interconnected at 7 for relative swivel motion. Spring latch 9 allows the clasp 8 to be releasably connected to the close control lead 2 or directly to a dog collar.

Figure 2:
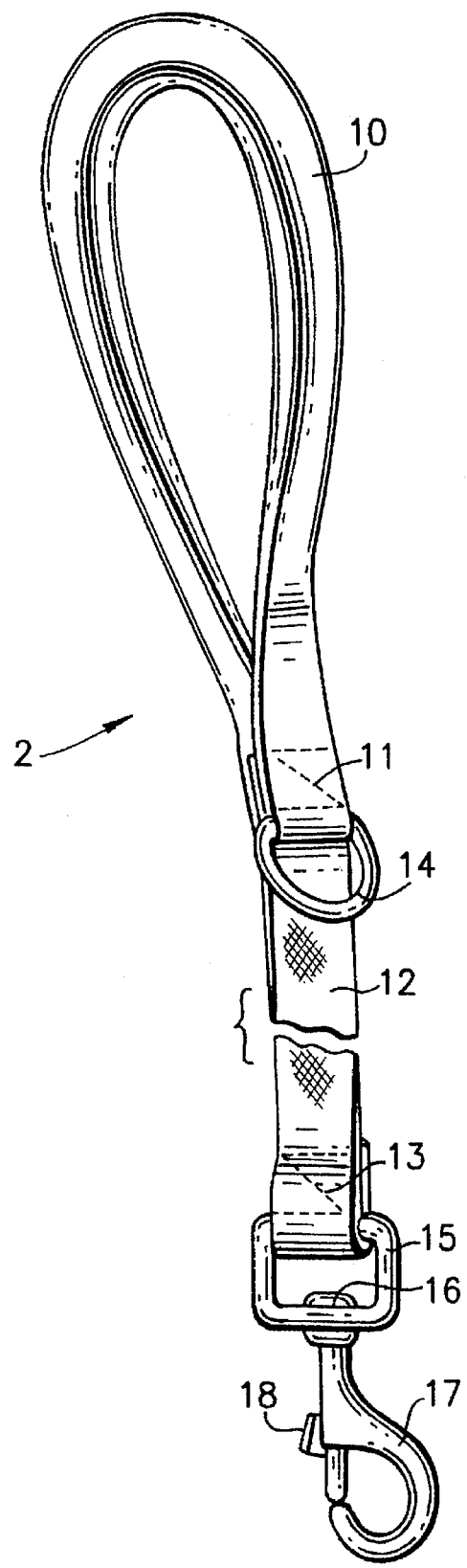
FIG. 2 shows the close control lead separately.

The close control lead 2 is best shown in FIG. 2 and is constructed with handle 10 sewn at 11 to lead portion 12. Lead portion 12 extends a short distance relative to lead portion 5 of distance lead 1, preferably between 10 to 20 inches. A ring 15 is attached to the other end of lead portion 12 by reinforced sewing as shown at 13. Clasp 17 is connected to ring 15 through swivel 16 for relative rotary movement. Spring latch 18 allows the lead 2 to be connected to a dog collar (not shown). An additional ring 14 is attached by reinforced stitching also at 11, the juncture of the handle 10 and the lead portion 12. Ring 14 can be a heavy duty D-ring. The location of the ring 14 is important so that the handle 10 is isolated from tension in the lead portion 5 of distance lead 1, while limiting the length of the close control lead 2 that extends out from the leash system to avoid possible entanglement. The connection of the distance lead 1 to the close control lead 2 at a point on the lead portion 12 of the close control lead 2 also allows a complete release of tension from the distance lead 1 after the transition is made.

It is important that the handle 10 be stiffened by an insert such as foam to enable a quick transfer of the hand hold from the distance lead 1 to the close control lead 2. In this manner the loop of the handle 10 remains open and easily accessible. Foam is also used in handle 3 for comfort. The stiffened structure of the handles 3 and 10 hinder the collapse of the handle loop when the lead is under tension. The shape of the handle is important, in order to provide a comfortable grip even for people with large hands or when using gloves. For this purpose the stiffened handles 3 and 10 are constructed having a tear drop shape which has interior dimensions of around 3 inches in width and approximately 5 inches in length.

The leash system of this invention is assembled in normal operation with the clasp 8 of distance lead 1 releasably attached to ring 14 of close control lead 2. The clasp 17 of close control lead 2 is connected to the dog collar by actuating the spring latch 18 and hooking the clasp 17 into the connecting ring of the dog collar (not shown). Under normal circumstances, the distance lead 1 is held at handle 3 and the dog is restrained by tension on lead portion 5 asserted by the handler. When the distance lead 1 is in use, the close control lead 2 is allowed to hang loose. When more restricted movement of the canine is desired, the grip of the handler is transferred to the handle 10 of close control lead 2 and the tension is assumed by the lead 2. The distance lead 1 may be folded or coiled out of the way. During extended periods of use of the close control lead 2, distance lead 1 may be completely disconnected from the system. This allows the close control lead 2 to be used independently for training or such special tasks such as crowd control or other similar police or security activities.

The leash portions 5 and 12 may be constructed of a heavy duty nylon webbing. When working with this material, it is generally cut with a heat knife which may leave hard sharp edges. To avoid such edges, in the leash of this system, all webbing ends are folded under itself as shown at joints 4 and 13.

In this manner a unique leash system is constructed which allows, interchangeably, the use of a long or a short leash. In addition each of the leashes are independently useable. The change from the distance lead 1 to the close control lead 2 can be accomplished without the need to remove tension from either lead.

I claim:

1. A dual length leash system for use in the control of a dog by a handler, which provides a distance operating length and a close control operating length comprising:

a. a distance control lead constructed having a first central lead portion, a first handle attached at one end of the first central lead portion and a first releasable connector attached at the other end of the first central lead portion, said first central lead portion having a length sufficient to allow a reasonable freedom of movement of the dog relative to the handler;

b. a close control lead constructed having a second central lead portion, a second handle attached at one end of the second central lead portion and a second releasable connector attached at the other end of the second central lead portion, said second central lead portion having a short length relative to the first central lead portion to significantly restrict movement of the dog relative to the handler; and c. connection means attached to the close control lead between the second handle and the second releasable connector to allow the first releasable connector to be releasably connected thereto.

2. A dual length leash system for use in the control of a dog by a handler, which provides a distance operating length and a close control operating length as described in claim 1 wherein the first and second releasable connectors are constructed to allow pivotal motion.

3. A dual length leash system for use in the control of a dog by a handler, which provides a distance operating length and a close control operating length as described in claim 1 wherein the second handle is stiffened to maintain a substantially open orientation.

4. A dual length leash system for use in the control of a dog by a handler, which provides a distance operating length and a close control operating length as described in claim 1 wherein the connection means is attached at the joint between the second handle and the second central lead portion.

* * * * *